Patented Dec. 1, 1936

2,062,667

UNITED STATES PATENT OFFICE 2,062,667

METHOD OF PREPARING PSEUDO-BUFOTALIN

Heizaburo Kondo, Shunichi Ikawa, and Yoshito Kobayashi, Tokyo, Japan

No Drawing. Application August 22, 1934, Serial No. 740,872

1 Claim. (Cl. 260—25)

The present invention relates to a method of preparing a heart medicine or the material thereof, which consists in shaking with the addition of petroleum ether the liquor extracted from the Chinese medicine "senso" (effective ingredient obtained from the secretion of the toad) by alcohol, separating a resinous matter by pouring ether into the lower one of the two layers thus produced, volatilizing said ether-alcohol solution into alcohol solution again, pouring the same into water and precipitating it, lixiviating it in a cold state with ethylacetate and then dissolving its distilled residue in dilute alcohol to crystallize out pseudo-bufotalin. The object thereof is to prepare a heart medicine which has an excellent medical effect by separating pseudo-bufotalin in a pure state which is the effective ingredient of "senso" (a Chinese medicine obtained from the secretion of the toad) or by manufacturing various kinds of derivatives from it.

Now, bufotalin is the term given by E. St. Faust of Germany in the year 1902 to the secretion of the toad (*Bufo Vulgaris schl.*) found in Europe which is a non-crystallizable effective ingredient resembling digitalin in pharmacological action. Subsequently, in 1922 it was ascertained by H. Wieland and his collaborator (B. 55, 1789) that its constitution is $C_{26}H_{36}O_6$ with the melting point of 145–146° C. Also, a Japanese named Munio Kotake has reported that he succeeded in separating said bufotalin from the secretion of the Japanese toad (*Bufo Vulgaris Formosus*). However, their yields are very trifling, and as there has been found no other material from which to obtain bufotalin, it has hitherto been impossible to make bufotalin effective as a practical medicine.

Pseudo-bufotalin according to the present invention has the same composition, namely $C_{26}H_{36}O_6$, as bufotalin and shows the melting point of 145–146° C., but on account of its different chemical property is called pseudo-bufotalin. This invention has solved simply the problem of preparing a heart medicine largely consisting of said product and its derivatives. That is to say, in this invention the handy Chinese medicine "senso" (effective ingredient obtained from the secretion of the toad) is employed as the raw material. The liquor extracted from it with alcohol is concentrated and is poured into cold water to obtain light brown precipitate, which after being filtered and dried is converted into alcoholic solution and then is shaken with the addition of petroleum ether. Next, ether is poured into the lower one of the two liquid layers thus produced so as to separate a resinous matter. Then, said ether-alcohol solution is volatilized into alcohol solution again, which is poured into water and precipitated. Finally, it is lixiviated in a cold state with ethylacetate and its distilled residue is crystallized from dilute alcohol. By thus easily preparing pseudo-bufotalin or its derivatives in large quantities, it is possible to produce a far more powerful practical medicine than bufotalin.

To observe the virtue of pseudo-bufotalin for stimulating the action of the heart of the frog by perfusion-method, although it resembles glucoside of digitalis qualitatively, it is far more powerful quantitatively, it being still possible to recognize the power of contracting the ventricle of the heart even with its $1 \times 10^8$ times solution. Also, although it is of poisonous character somewhat resembling digitoxin which is glucoside in the leaf of digitalis, it hardly shows the action of accumulating in the human body as compared with digitoxin, which exhibits such action to a high degree. Next, to explain the difference between bufotalin and pseudo-bufotalin, bufotalin, for instance, loses acetyl radical and water when it encounters concentrated hydrochloric acid, and produces bufotalin ($C_{24}H_{30}O_3$), whereas pseudo-bufotalin does not produce pseudo-bufotalin corresponding to it, but always produces anhydrous pseudo-bufotalin chloride comprising acetyl radical and also containing chlorine. Even if made to react in glacial acetic acid solution with hydrobromic acid in place of hydrochloric acid, it always produces pseudo-bufotalin bromide ($C_{26}H_{35}O_5$ Br.) and never separates acetyl radical. On the contrary, a very powerful heart medicine may be obtained, whereas as bufotalin is hydrolyzed easily by hydrohalogenic acid to separate acetyl radical and simultaneously receives dehydrating action to separate water, it may be regarded in its result that it separates acetic acid, the reaction being as shown below:—

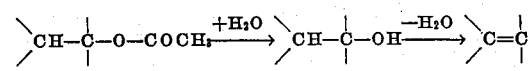

Pseudo-bufotalin not separating acetyl radical as stated above, is not hydrolyzed by hydrohalogenic acid, but if it is saponified with alkali (caustic alkali, ammonia, etc.) and acetyl radical is separated, the hydroxyl radical produced causes intermolecular transformation and becomes stable ketoform and has no more room for affecting dehydrating reaction. The reaction is as follows:—

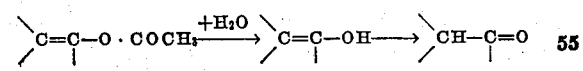

Thus, although it is stable chemically and is less effective than the former from the standpoint of pharmacological action, it may distinguish it from the former.

The following are examples of carrying out the present invention into practice.

I. Pulverize 300 grams of the Chinese medicine "senso" (effective ingredient obtained from the secretion of the toad) and lixiviate it several times with methyl alcohol at a temperature not above 40° C. Collect the liquor extracted and concentrate it in a water bath below 40° C. under reduced pressure. Pour it into water, polishing it in a mortar and leave it alone for one day and night, and then light brown precipitate will be obtained. After filtering it and nearly drying it on an unglazed porcelain plate, dry it under vacuum in a calcium chloride desiccator, and 68 grams of the yield (about 22% of the material) will be obtained.

Dissolve 50 grams of the above crude product in a hot state in 50 c. c. of absolute alcohol and after being cooled, shake it sufficiently with the addition of petroleum ether to dissolve fat, cholesterin, etc., and separate the upper layer (petroleum ether layer). Next, after adding ether to the lower layer to remove a resinous matter, distil said ether-alcohol solution under reduced pressure. Dissolve the residue again in hot alcohol and cool it. Then, pour it into iced water, shaking it sufficiently and produce the precipitate, rubbing the wall of the vessel with a glass stick, and 35 grams of slightly flesh-colored powder (about 11% of the material) will be obtained.

Next, if the above refined powder is lixiviated in a cold state with ethylacetate and is crystallized out from dilute alcohol after removing the solution by distillation, 25 grams (about 8% of the material) of fine white crystal of pseudo-bufotalin will be obtained. It contracts at 107° C. and has the melting point of 145–146° C. at which it produces bubbles. The result of its analysis shows that it agrees with $C_{26}H_{36}O_6$.

II. Cooling 5 grams of pseudo-bufotalin obtained in the foregoing example, which has been dissolved in 200 c. c. of glacial acetic acid, down to nearly 0° C. and saturate it with dry hydrobromic acid by passing the latter upon it. When its contents have gradually presented a dark reddish brown color and are of syrupy viscosity, leave it alone at room temperature (about 20° C.) for 3 to 4 nights and days, after which it is (a) distilled under reduced pressure to remove excesses of hydrobromic acid and glacial acetic acid and then water is added to crystallize out the reacted product or (b) it is mixed with water directly and is shaken and extracted with ethylacetate. Make solution of glacial acetic acid from the residue obtained by distilling the above extracted liquor and add water thereto to crystallize out the reacted product, which then are suck-filtered and washed with water. Dry them on an unglazed porcelain plate, and about 5 grams (about 87% of the theoretical number) of pseudo-bufotalin bromide will be obtained. This substance has a light yellow color and contracts at approximately 70° C. It has the melting point of 100–114° C., at which it produces bubbles. It is very difficult to dissolve in alcohol and the result of its analysis shows that it agrees with $C_{26}H_{35}O_5Br$. This product even when dissolved in $1 \times 10^{12}$ times water, still has the power of contracting the ventricle of the heart. Indeed, it is even about 10,000 times more powerful than pseudo-bufotalin. Moreover, it is less poisonous and the quantity necessary to kill warm-blooded animals is nearly 70 times greater than pseudo-bufotalin.

III. By employing hydrochloric acid gas instead of hydrobromic acid under exactly the same condition as in Example II, pseudo-bufotalin chloride may be prepared. It may be derived from dilute alcohol into a crystalline state. It has a light yellow color with the melting point of 125–128° C., at which it produces bubbles. Its effect as a medicine is substantially the same as that of the product described in Example II.

IV. Dissolve 10 grams of pseudo-bufotalin obtained in Example I in 600 c. c. (about 6 or 7 times greater than the calculated quantity) of ½ normal alcoholic potassium hydroxide solution (1,500 c. c. if ⅕ normal solution) and boil it on a water bath for nearly one hour for saponification. Next, concentrate it under reduced pressure and add acetic acid and then crystallize out the reacted product, or reversely after acidifying it with acetic acid, concentrate it under reduced pressure to crystallize out the reacted product, after which it is extracted with ethylacetate. Dissolve the residue obtained by volatilizing the above extracted liquor in dilute alcohol and crystallize it, and then about 7 grams (74% of the theoretical number) of desacetyl-pseudo-bufotalic acid ($C_{24}H_{36}O_6$) will be obtained. The substance thus obtained has a white color and, if dried at a low temperature, contracts at 95° C. and shows the melting point of 130° C. (does not produce bubbles). It is also soluble in alkali carbonate and can be easily methylized by diazomethane. However, if heated or left long in a vacuum drying apparatus, this substance gradually causes lactone closed chains and becomes insoluble in alkali carbonate till it produces desacetyl-pseudo-bufotalin ($C_{24}H_{34}O_5$).

The above mentioned pseudo-bufotalic acid or pseudo-bufotalin may be suitably used as the raw material for various derivative compounds of pseudo-bufotalin.

V. Dissolve 7.5 grams of desacetyl-pseudo-bufotalin or desacetyl pseudo-bufotalic acid obtained in the preceding Example IV in 500 c. c. of glacial acetic acid and saturate it with hydrochloric acid gas by passing the latter upon it, while cooling it at about 0° C. When its contents have gradually shown a dark purple color, leave it for one or two days and nights at room temperature (about 20° C.) and subject it to distillation under reduced pressure to remove excesses of hydrochloric acid gas and glacial acetic acid. Then, add water, and non-crystallizable light yellow precipitate will be produced. Next, suck-filter it, and after being dried on an unglazed porcelain plate, lixiviate it in a cold state with ethylacetate. Then, dissolve in dilute alcohol the residue obtained by distilling the above extracted liquor and crystallize it out, and about 6 grams (77–80% of the theoretical number) of desacetyl-pseudo-bufotalin-chloride will be obtained.

The substance thus obtained has a light yellow color with the decomposing point of 140–145° C. The result of its analysis shows that it agrees with $C_{24}H_{33}O_4Cl$. Also, its acetyl compound shows the decomposing point of 160–165° C. and has a medical effect several times greater than pseudo-bufotalin. In fact, it has been ascertained that even a $5 \times 10^9$ times solution still has the power of stimulating the action of the heart and that it is rather less poisonous.

We claim:

Method of preparing a heart medicine, which consists in lixiviating "senso" (a Chinese medicine obtained from the secretion of the toad) with alcohol, shaking said solution with the addition of petroleum ether, removing the upper layer of petroleum ether solution and pouring ether into the lower layer, removing the resinous matter thus separated, volatilizing the remaining ether-alcohol solution into alcohol solution again, pouring it into water and precipitating it, lixiviating it in a cold state with ethylacetate and then turning its distilled residue into alcohol solution again to crystallize out an effective ingredient from it.

HEIZABURO KONDO.
SHUNICHI IKAWA.
YOSHITO KOBAYASHI.